US011698928B2

(12) United States Patent
Tanner et al.

(10) Patent No.: US 11,698,928 B2
(45) Date of Patent: Jul. 11, 2023

(54) SYSTEM AND METHOD FOR INTELLIGENT PRIORITIZATION OF MEDIA RELATED TO AN INCIDENT

(71) Applicant: MOTOROLA SOLUTIONS, INC., Chicago, IL (US)

(72) Inventors: Kylene Tanner, Bountiful, UT (US); Roger Rodriguez, Garnerville, NY (US); Kyle Hoertsch, Carmichael, CA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 78 days.

(21) Appl. No.: 16/695,247

(22) Filed: Nov. 26, 2019

(65) Prior Publication Data

US 2021/0158047 A1 May 27, 2021

(51) Int. Cl.
G06V 20/40 (2022.01)
G06F 16/41 (2019.01)
G06K 9/62 (2022.01)
G06V 10/98 (2022.01)
G06V 20/52 (2022.01)
G06F 16/75 (2019.01)
G06F 18/211 (2023.01)
G06V 20/00 (2022.01)
G06V 40/16 (2022.01)

(52) U.S. Cl.
CPC .............. G06F 16/75 (2019.01); G06F 16/41 (2019.01); G06F 18/211 (2023.01); G06V 20/41 (2022.01); G06V 20/46 (2022.01); G06V 20/52 (2022.01); G06V 20/00 (2022.01); G06V 20/40 (2022.01); G06V 40/16 (2022.01)

(58) Field of Classification Search
None
See application file for complete search history.

(56) References Cited

U.S. PATENT DOCUMENTS

| 9,386,050 | B2 | 7/2016 | Oswald | |
|---|---|---|---|---|
| 2011/0320823 | A1* | 12/2011 | Saroiu | H04L 9/3218 713/189 |
| 2012/0278387 | A1* | 11/2012 | Garcia | G06F 16/335 709/204 |
| 2013/0011083 | A1* | 1/2013 | Berkovich | G06F 16/285 382/305 |
| 2016/0352808 | A1 | 2/2016 | Kim et al. | |
| 2017/0070358 | A1* | 3/2017 | Svendsen | H04L 67/04 |
| 2018/0253814 | A1* | 9/2018 | Kaguma | G06Q 50/265 |

(Continued)

OTHER PUBLICATIONS

Rapid Triage of Diverse Media Devices. Merlino et al (Year: 2013).*

(Continued)

Primary Examiner — Delomia L Gilliard

(57) ABSTRACT

Techniques for prioritization of media related to an incident are provided. Confirmed incident related media may be retrieved, the confirmed incident related media having been confirmed as being associated with the incident. Artifacts of interest may be identified in the confirmed incident related media. Presence of the artifacts of interest in a plurality of received media may be determined. The plurality of received media may be prioritized based on the presence of the artifacts of interest.

15 Claims, 3 Drawing Sheets

(56) References Cited

U.S. PATENT DOCUMENTS

2019/0372946 A1* 12/2019 Nadeau .................. H04L 63/30
2020/0014816 A1* 1/2020 Speasl ................ H04N 1/00129

OTHER PUBLICATIONS

Johnson, Eric et al.: "Device and Method for Providing Relevant Video Content to Members of a Communication Group", U.S. Appl. No. 16/227,254, filed Dec. 20, 2018, all pages.

Merlino Andrew et al: "Rapid triage of 1-20 diverse media devices: Boston marathon bombings: An operational case study of time critical response", 2013 IEEE International Conference on Technologies for Homeland Security (HST), IEEE, Nov. 12, 2013 (Nov. 12, 2013) 9 pp. 207-211, XP032550147, DOI: 10.1109/THS.2013.6699001 [retrieved on Dec. 30, 2013] the whole document figure 7.

The International Search Report and the Written Opinion corresponding patent application No. PCT/US2020/059078 filed Nov. 5, 2020, dated Jan. 14, 2021, all pages.

\* cited by examiner

SYSTEM AND METHOD FOR INTELLIGENT PRIORITIZATION OF MEDIA RELATED TO AN INCIDENT

BACKGROUND

Cameras in today's society are ubiquitous. It is almost impossible for an individual to leave their home and not be captured by at least one fixed surveillance camera. Fixed surveillance cameras may include doorbell cameras, traffic cameras, security cameras, etc. In addition, that vast majority of adults and many children in developed nations carry with them at least one device (e.g. smartphone, tablet, digital camera, etc.) that is capable of taking pictures and/or recording audio and video. Furthermore, public safety officials, such as police officers, may also be associated with many different types of cameras (e.g. car dashboard camera, body worn camera, digital camera, ruggedized smartphone, etc.). It is safe to say that the amount of video data that is being generated is on an increasing trajectory.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
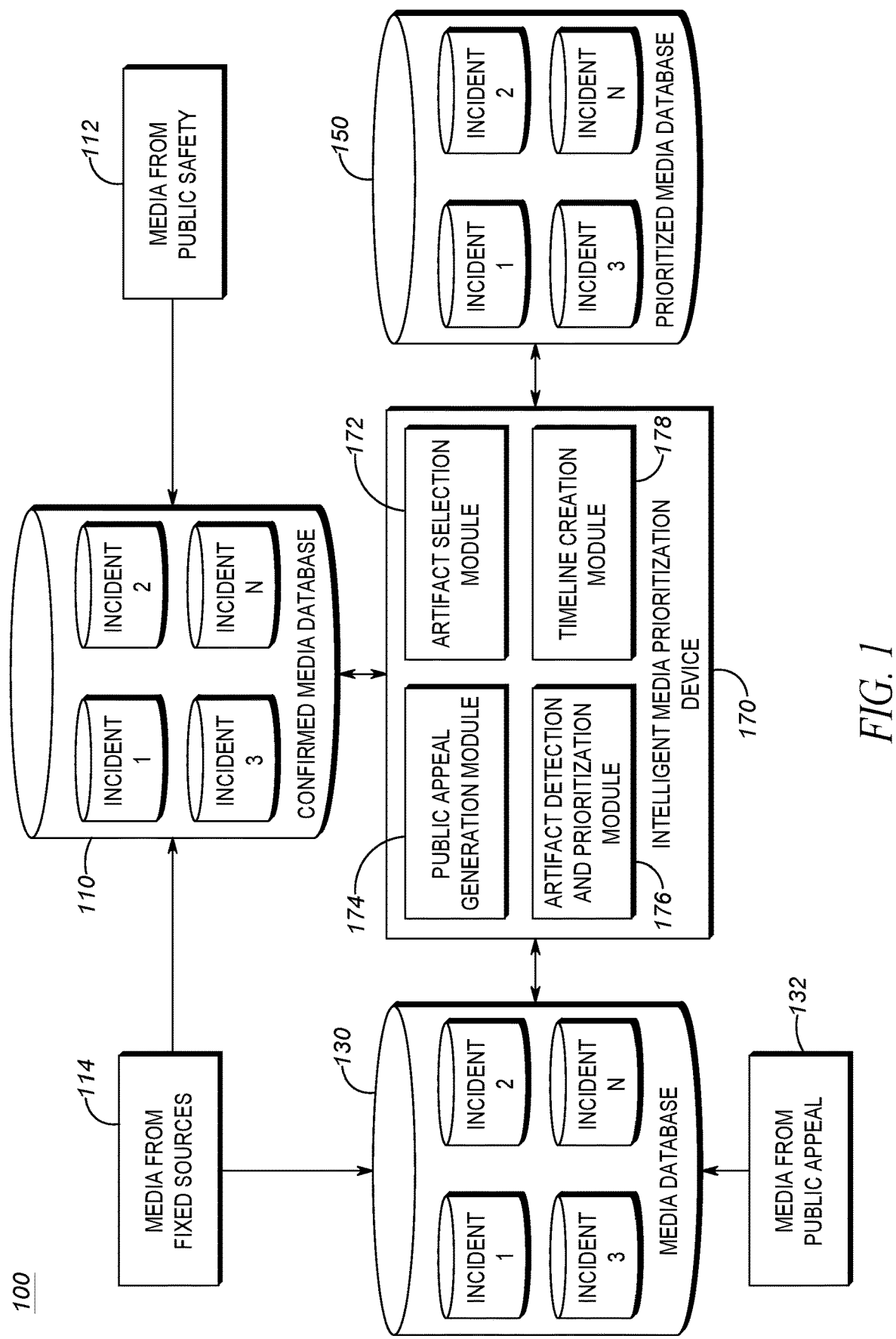
FIG. 1 is an example system that may implement the intelligent prioritization of media related to an incident techniques described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The omnipresence of devices capable of capturing images, such as still frames and video images (with and without audio) has been very beneficial to public safety personnel, in particular law enforcement personnel. In the past, if there were no witnesses to a crime, it was difficult, if not impossible, to determine what occurred. Even if there were witnesses, it was not possible to determine if the witnesses were accurately representing what they saw/heard. For example, a crime victim's description of what occurred may be very different from the crime perpetrator's description of that occurred which in turn can be very different than the description provided by an uninvolved bystander.

In today's world, there is a high likelihood that any location where an incident occurs is covered by one or more fixed cameras. When law enforcement arrives at the incident scene, additional video may be generated by dashboard and body worn cameras. Furthermore, if an incident occurs and there are witnesses, it is very often the case that the first reaction of those witnesses is to pull out a smartphone and begin recording video. Law enforcement personnel may then request that any members of the public that have video related to a specific incident (e.g. specific time, place, etc.) provide those recordings for review by law enforcement personnel. Thus, it is very often the case that when an incident occurs, there is a plethora of video available, from many different sources.

The sheer volume of images and video, which may be generically referred to as media or media files, that may be available presents multiple problems. One problem is that organizing storage of the media files themselves becomes problematic. In all but the smallest law enforcement agencies it is likely that there will be more than one incident that is being processed at any given time. When a request is made to the public for copies of video associated with an incident, it is difficult to associate the received video with a given incident without human intervention. For example, assume that a traffic accident occurred and law enforcement sent a public appeal for video of the accident. Assume an armed robbery also occurred and law enforcement sent a public appeal for video of that crime. As videos are received from the public (e.g. via email, upload to a website, dropped off at the police station on a flash drive, etc.) it is difficult to associate a particular media file with a particular incident without requiring human intervention.

A human user would need to either view a portion of the media file or read a description contained in the text (e.g. the email) to identify which incident a particular media file is associated with. The human user would then need to properly store the media file in a location (e.g. file folder within an evidence management system, etc.) associated with the incident. Such a solution becomes infeasible as the number of incidents increases. A large agency may have hundreds if not thousands of incidents in various stages of investigation. It would not be possible for a human user to keep track of all incidents at the level of detail necessary to review media files and store them in a way that is associated with the incident.

A more pressing problem is that even when the media files are properly associated with an incident, there is no ability to determine which media files are the most relevant and/or most suited for use in investigating the incident without actually viewing each media file. For example, consider a bank robbery that occurred in a city at a certain time on a certain day. Law enforcement may send out a request to the public for anyone who has media file capturing the location of the bank, on the specified day, at the specified time.

Despite the fact that fact that law enforcement requested specific video, there is no way to prevent members of the public from uploading completely irrelevant video (e.g. wrong time, wrong location, etc.). In some cases, this may occur with no ill intent (e.g. the submitter truly thought he was submitting relevant video). Other times the irrelevant video may be submitted by people with the intent to cause law enforcement personnel to waste time. Large amounts of time may be wasted reviewing this irrelevant information. Additionally, the quality of various media files may vary, such that one media file is more suited for use than another. For example, two citizens may submit a video file that captured an occurrence of an incident (e.g. proper time, place, etc.). However, in one video, the scene may be obscured (e.g. citizens finger inadvertently covering lens). As should be clear, the non-obscured video would be preferable to view first.

The techniques described herein overcome these problems and others, individually and collectively. When generating a public appeal for media files related to an incident, a law enforcement agency may first generate a tag associated with the incident. The tag may be an incident specific QR code, web site universal resource identifier (URI), a bar code, a hashtag, etc. When sending out the public appeal, the unique tag may be included with instructions to use the tag when providing media files (e.g. scanning a QR code with a smartphone directs a user to a website where a file can be uploaded, etc.). Thus, when the media file is received, it is associated with the tag, and as such, is associated with the incident. The media file may then be stored in an evidence system as being associated with the particular incident.

Once associated with an incident, the media files may be prioritized. In a first form of prioritization, artifacts of interest may be identified by law enforcement officers. For example, a law enforcement officer may obtain video of an incident scene using a camera such as a body worn camera. Because the officer has obtained the video while on scene at the incident, the media is confirmed as being associated with the incident. The officer may then identify elements of interest, referred to as artifacts, within the confirmed video. For example, the officer may identify a store front sign as an artifact of interest. Video analytics techniques may then be used to analyze the received media files for those files that contain the artifact of interest. Those media files containing the artifacts of interest may be prioritized over those that do not.

In a second form of prioritization, the media files are prioritized based on characteristics of the media file itself. For example, video may be prioritized over still images, video with audio may be prioritized over video without audio, higher resolution media may be prioritized over lower resolution media, media with a timestamp corresponding to the time of interest can be prioritized over media with non-corresponding timestamps, media including global positioning system (GPS) coordinates of the specific incident area may be prioritized over media with incorrect GPS coordinates, video from fixed cameras (e.g. stable image) may be prioritized over video from mobile cameras (e.g. shaky image). What should be understood is that one form of prioritization is based on the metadata of the media file (e.g. information about the media file) while the other is based on the actual content of the media file.

It should be understood that the techniques described herein do not automatically discard any media files. Instead, the received media files are prioritized based on the factors like those described above. As such, media files of higher quality and containing artifacts of interest are prioritized over lower quality media files that do not contain artifacts of interest. By viewing the media files from highest priority to lowest priority, law enforcement personnel can identify the most relevant media files without having to manually review every received media file.

Finally, the techniques described herein may be utilized to stitch together a composite timeline of the video of an incident that utilizes the highest priority video for each time slice of the timeline. For example, consider a case where there are multiple media files of varying quality covering an incident with a three-minute duration. The multiple video files may be stitched together such that for each time slice of the timeline (e.g. every 30 seconds) the highest priority media file (e.g. the highest quality, highest resolution, etc.) for that time slice is used to create the composite timeline video. The end result being that the composite timeline is then made up of the highest priority media that is available for each given time slice.

A method for prioritization of media related to an incident is provided. The method may comprise retrieving confirmed incident related media, the confirmed incident related media having been confirmed as being associated with the incident. The method may further comprise identifying artifacts of interest in the confirmed incident related media. The method may further comprise determining presence of the artifacts of interest in a plurality of received media. The method may further comprise prioritizing the plurality of received media based on the presence of the artifacts of interest.

In one aspect, the method may further comprise generating a tag associated with the incident, sending an appeal to the public for submission of media related to the incident, the appeal including the tag, and receiving media related to the incident from the public, the received media associated with the tag. In one aspect, the artifacts of interest comprise objects within the confirmed incident related media. In one aspect, the method may further comprise further prioritizing the plurality of received media based on at least one of a timestamp of the received media and a location of generation of the received media.

In one aspect the method may further comprise further prioritizing the plurality of received media based on a quality of the received media. In one aspect the method may further comprise further prioritizing the plurality of received media based on a stability of the received media. In one aspect the method may further comprise creating an incident timeline for the incident, the incident timeline comprising the highest priority media available for each time slice.

A system for prioritization of media related to an incident is provided. The system may include a processor and a memory coupled to the processor. The memory may contain thereon a set of instructions that when executed by the processor cause the processor to retrieve confirmed incident related media, the confirmed incident related media having been confirmed as being associated with the incident. The instructions may further cause the processor to identify artifacts of interest in the confirmed incident related media. The instructions may further cause the processor to determine presence of the artifacts of interest in a plurality of received media. The instructions may further cause the processor to prioritize the plurality of received media based on the presence of the artifacts of interest.

In one aspect, the instructions may further cause the processor to generate a tag associated with the incident, send an appeal to the public for submission of media related to the incident, the appeal including the tag, and receive media related to the incident from the public, the received media associated with the tag. In one aspect, the artifacts of interest comprise objects within the confirmed incident related media. In one aspect, the instructions may further cause the processor to further prioritize the plurality of received media based on at least one of a timestamp of the received media and a location of generation of the received media.

In one aspect, the instructions may further cause the processor to further prioritize the plurality of received media based on a quality of the received media. In one aspect, the instructions may further cause the processor to further prioritize the plurality of received media based on a stability of the received media. In one aspect, the instructions may further cause the processor to create an incident timeline for the incident, the incident timeline comprising the highest priority media available for each time slice.

A non-transitory processor readable medium containing a set of instructions thereon is provided. When executed by a processor the instructions may cause the processor to retrieve confirmed incident related media, the confirmed incident related media having been confirmed as being associated with the incident. The instructions may further cause the processor to identify artifacts of interest in the confirmed incident related media. The instructions may further cause the processor to determine presence of the artifacts of interest in a plurality of received media. The instructions may further cause the processor to prioritize the plurality of received media based on the presence of the artifacts of interest.

In one aspect, the instructions contained on the medium may further cause the processor to generate a tag associated with the incident, send an appeal to the public for submission of media related to the incident, the appeal including the tag, and receive media related to the incident from the public, the received media associated with the tag. In one aspect, the instructions contained on the medium may further cause the processor to further prioritize the plurality of received media based on at least one of a timestamp of the received media and a location of generation of the received media.

In one aspect, the instructions contained on the medium may further cause the processor to further prioritize the plurality of received media based on a quality of the received media. In one aspect, the instructions contained on the medium may further cause the processor to further prioritize the plurality of received media based on a stability of the received media. In one aspect, the instructions contained on the medium may further cause the processor to create an incident timeline for the incident, the incident timeline comprising the highest priority media available for each time slice.

FIG. 1 is an example system that may implement the intelligent prioritization of media related to an incident techniques described herein. System 100 may include confirmed media database 110, media database 130, prioritized media database 150, and intelligent media prioritization device 170.

Confirmed media database 110 may store media files that have been confirmed to include an incident location. For example, media generated by public safety personnel 112 (e.g. dashboard camera, body worn camera, etc.) when those personnel arrive at an incident scene is confirmed media because public safety personnel can be assured that it was generated at the actual incident scene. Confirmed media database 110 may store confirmed media segregated by incident. As shown in FIG. 1, there are four separate incidents currently in progress, incident 1, 2, 3, and n. It should be understood that there may be any number of concurrently existing incidents.

Confirmed media database 110 may also store media from fixed sources 114. In many cases, public safety personnel have access to different types of fixed video sources that are trusted. A first of these types may be fixed surveillance cameras that are owned and maintained by the public safety agency themselves. Because the public safety agency owns and operates these cameras, the level of trust in the media produced by those cameras is high.

A second type of trusted fixed video source may be cameras that are owned by other government agencies. For example, the department of transportation of a city may own and operate a number of cameras for use in managing traffic. The video feeds from these cameras may be made available to public safety systems. Yet a third form of trusted media from fixed sources may be cameras that are privately owned, but have been registered with public safety systems and have granted access to the public safety systems. For example, a convenience store owner may install a surveillance camera system in a store and register that system with a public safety agency. As part of the registration, the convenience store owner may grant public safety personnel permission to access the video without additional process (e.g. warrants, probable cause, etc.) Such arrangements are beneficial for both public safety personnel and the store owner.

What should be understood is that media from fixed source 114 is coming from a source that does not move. Thus, unlike video generated from a mobile device, it is possible to have high confidence that the images captured by such a fixed camera can actually be treated as confirmed video. For example, if there is a fixed camera pointed at an incident scene, it is safe to assume that media generated from that camera covers the incident scene. Media from fixed sources can thus be considered confirmed video and may be stored in the confirmed media database.

Media database 130 may store media files that are associated with incidents. For example, the media database may include media that was submitted by the public in response to a public appeal 132. As explained briefly above, and will be explained in further detail below, public safety personnel may generate an appeal to the public for media that was related to an incident. The appeal may include a tag (e.g. QR code, URI, etc.) that allows members of the public to upload videos that are related the incident and will cause those uploaded videos to be properly associated with the incident for which the tag was generated.

What should be noted is that media received from the public in response to the public appeal is not the same as confirmed media. When sending in media using the tag, there is no way to ensure that the media that is uploaded is relevant. In fact, there is no way to ensure that the media was even generated at the time/location of the incident for which the appeal has been sent. Certain members of the public may even decide to upload irrelevant media in an attempt to make it more difficult for law enforcement to carry out their duties. In the past, law enforcement personnel had to manually view every video to determine if it was relevant. As will be explained further below, the techniques described herein may not necessarily eliminate the need to manually view each submitted piece of media, but will at least allow for prioritization of the received media, such that the most relevant media may be viewed first.

Media database 130 may also store media from fixed sources 114. As explained above, there are many sources of media from fixed sources. This media may or may not be associated with an incident at the time it is recorded. For example, consider the case where there is a fixed law enforcement owned camera that is capturing a field of view that includes a street corner that is a known location for criminal activity (e.g. drug dealing, etc.). Until an actual crime occurs at that street corner, there is no incident at that location. As will be explained in further detail below, storing media from fixed sources in the media database allows for retrieval of media that may be available, but which was not submitted in response to a public appeal.

Prioritized media database 150 may store media from each incident prioritized in such a way that the most relevant media has higher priority and less relevant media has lower priority. The relevance of media will be described in further detail with respect to the intelligent media prioritization device 170 described below. What should be understood is that for each incident, a prioritized list of available media is created. When reviewing media related to an incident, it may be more efficient and require less manpower for law enforcement to review available media in order of priority, such that the most relevant media is viewed first.

Although the confirmed media database 110, the media database 130, and the prioritized media database 150 are depicted as separate databases, with separate incident related data stores within each database, it should be understood that the techniques described herein are not dependent on such an implementation. Any suitable mechanism may be used to associate media files with both the specific types (confirmed, etc.) as well as incidents. For example, confirmed media files associated with a specific incident may all be stored in the same file folder in a computer file system and each of those files may have an associated descriptor indicating if it is a confirmed media file or not. The prioritized list of media files may simply be a list that points to those stored media files in proper order.

As another implementation, the media file metadata may be modified to indicate an association with an incident. As yet another example, an index may be maintained that associates each media file with an incident. What should be understood is that it is possible to extract media files that are associated with a given incident, without having to wade through all media files.

It should further be understood that in some implementations, the confirmed media database 110, the media database 130, and the prioritized media database 150 may be included in a larger public safety records and evidence system that may provide the ability to track information such as chain of custody for later use of the media files as evidence in court trial. Each media file, for example, may be digitally signed to ensure that it has not been altered after it was submitted. A records and evidence system may also provide audit capabilities so that it may be determined who has accessed the system to interact with the media files.

System 100 may also include intelligent media prioritization device 170. The intelligent media prioritization device may include artifact selection module 172, public appeal generation module 174, artifact detection and prioritization module 176, and timeline creation module 178. Although modules 172-178 have been depicted as part of a singular intelligent media prioritization device, it should be understood that this is merely one example implementation. In other implementations, each module may be implemented within an independent device, or multiple modules may be implemented in a single device. What should be understood is that the functionality described below is provided. The techniques described herein are not dependent on any particular hardware implementation.

Artifact selection module 172 may be used by public safety personnel to identify objects of interests within media files. Artifacts may be anything within a media file that can be identified through automated means. For example, facial recognition systems are able to scan media files to detect the presence of a particular face in those media files, and as such a face may be an artifact of interest. Likewise, automatic license plate readers (ALPR) systems are able to detect license plates in a media file, and thus license plates may be considered an artifact.

There are many different types of object classifiers available that can be used to detect artifacts of interest in a media file. For example, object classifiers are available to detect a person's appearance (e.g. male/female, height, weight, clothing color, clothing type, etc.). Object classifiers are available to detect the presence of weapons in a media file (e.g. gun, knife, baseball bat, etc.). Object classifiers may detect items within a media file (e.g. make/model/color of car, bicycles, motorcycles, etc.). Object classifiers are available to detect particular elements/grouping of elements in a field of view (e.g. images of a store front, a hallway, a street scene, etc.) of a camera that captured the field of view.

What should be understood is that using artifact selection module 172, public safety officers may be able to view media files (e.g. media files form the confirmed media database 110) to identify artifacts of interest in those confirmed media files. The identified artifacts of interest may then be used to prioritize media files, as will be explained in further detail below.

Public appeal generation module 174 may be used by public safety personnel to generate an appeal to the public for submission of media related to an incident. Public safety personnel may determine that they wish to send an appeal to the public for media related to an incident and use public appeal generation module to generate a tag that is associated with the incident. The tag may then be included as part of the appeal that is sent to the public. The tag may be a Quick Response (QR) code, a bar code, a specific Universal Resources Identifier (URI) (e.g. a website), a specific file folder on a cloud server, a file transfer protocol (FTP) location, etc. What should be understood is that the tag is associated with the incident for which media is being requested.

Public safety personnel may then communicate the appeal for media related to the incident to the public. The appeal may include the tag. The appeal to the public may be sent via any available communications means. For example, social media (e.g. Twitter, Facebook, Instagram, etc.) may be used to send the appeal. Traditional media may be used as well. For example, ads on television or radio. Public safety may create an appeal for media that includes the tag and instructs the public to utilize the tag when submitting media. When the media is submitted, the tag is used to automatically associate the media with the incident that the tag was generated for.

The public appeal may be generic to an incident location. For example, if an incident occurred at 123 Main St., at 2:00 PM, on November 10, the appeal may simply ask the public for any available media that was generated around that time around that location. In other cases, the appeal may be more specific, and include artifacts of interest previously identified. Continuing with the example, the incident may have been a car accident involving a silver car with a specific license plate. The public appeal may then request any media generated around the specified timeframe that includes the presence of a silver car.

Artifact detection and prioritization module 176 may be used to detect artifacts of interest within the available media files and prioritize those media files based on the presence of artifacts of interest as well as other factors related to the media quality. As explained above, there are many different mechanisms for automatically identifying artifacts of interest in a media file (e.g. facial recognition, ALPR, object classifiers, etc.). Public safety personnel may have previously identified artifacts of interest in confirmed media files using artifact selection module 172. At this point, the artifact detection and prioritization module may process all media that has been received and is associated with the incident to detect those pieces of media that include the artifact of interest. It should be understood that although only a single artifact of interest is described, the techniques described herein may be utilized to detect multiple artifacts of interest in a single piece of media.

Artifact detection and prioritization module 176 may prioritize media based on the presence of the artifacts of interest. Media that includes at least on artifact of interest may be prioritized higher than media that does not include any artifacts of interest. Likewise, media that includes higher numbers of artifacts of interest maybe prioritized over media that includes fewer number of artifacts of interest.

Artifact detection and prioritization module 176 may also prioritize media based on other factors. For example, media that was generated at the time of the incident may be prioritized over media that was generated at a different time. Media that was generated at the location of the incident may be prioritized over media generated at a different location. Media that is of a higher quality (e.g. resolution, color, etc.) may be prioritized over media of lesser quality. Media that includes audio may be prioritized over media that does not include audio.

The prioritized list of media may then be stored in the prioritized media database 150. As mentioned above, the prioritized media database may not actually be a separate database, but could instead be a logical construct within a larger records and evidence system. What should be understood is that the prioritized media database contains a prioritized list of received media files that are related to a specific incident. Higher priority media will tend to include artifacts of interest and be of higher quality. Lower priority media will tend to include fewer (or no) artifacts of interest, may not have been generated at the time of the incident, may not be generated at the location of the incident, etc. By reviewing the received media in order of priority, law enforcement personnel will be able to view the media that is most likely to be relevant to the incident first, without having to randomly wade through all received media.

Timeline creation module 178 may be used to create a video timeline of the available media for the incident. The timeline creation module may divide a time period into multiple time slices (e.g. 30 second time slices). For each time slice, the media that is of the highest priority for that time slice may be included in the video timeline. Thus, the video timeline may include the highest priority video (e.g. the best video) available for that particular time slice. It should be noted that when creating the timeline, it may be necessary to reevaluate the media for each given time slice. For example, the media that is the highest priority for the first time slice may not necessarily be the media that is the highest priority for the second time slice. However, it should be understood that reprioritization based on time slice may simply use the same techniques as described above, with the time of the time slice of interest being a factor used in the prioritization.

The operation of the system in FIG. 1 may be more easily understood in the context of an example. Assume that an armed robbery of a convenience store occurred at 1:00 PM, at 123 Main Street, on Nov. 10, 2019. Assume that the store had a surveillance camera (no audio) covering the cash register that captured an image of the suspect. Assume the camera was registered with law enforcement, and the media from the camera is available in the media database 130. Assume that there was a customer inside the store that recorded media, including audio, of the crime on their smartphone. Assume that there was a passerby that noticed the commotion and recorded media of the suspect fleeing the store on their cell phone. Also assume there was a fixed camera owned by the department of transportation and was accessible by law enforcement and whose field of view also captured the fleeing suspect. Assume that the convenience store has a distinctive logo on the front and that the responding officer's body worn camera captured an image of the storefront.

Initially, law enforcement personnel may gather all confirmed media and store that media in the confirmed media database 110, associated with the robbery incident, which will be referred to as incident 1. In this case, confirmed video may include the image of the storefront logo as captured by the officer's body worn camera, as well as the media captured by the store surveillance camera. The officer may view this confirmed video and identify artifacts of interest utilizing artifact selection module 172. Artifact selection module 172 may provide an interface through which an officer can view video, and select artifacts of interest via an input device (e.g. bounding box around objects of interest, face identification, etc.).

For example, if the suspect was wearing jeans with a red shirt, an artifact of interest may be people wearing jeans and a red shirt (note: appearance search classifiers that can automatically identify such characteristics are commercially available). Yet another artifact of interest may be the storefront logo, which can be an artifact that is associated with the incident location. Yet another artifact of interest may be the gun that was used in the armed robbery.

Law enforcement may then generate a tag associated with the incident using public appeal generation module 174. An appeal may be sent to the public, using public appeal generation module, to provide any media that may have been generated around 1:00 PM, at 123 Main Street, on Nov. 10, 2019. The appeal (e.g. social media, traditional media, etc.) may include the generated tag. Members of the public may receive the appeal and provide media in accordance with the appeal by using the tag. As mentioned above, when utilizing the tag, the received media is automatically associated with incident 1 for which the appeal was generated and stored in the media database 130 and is associated with incident 1.

Assume that the person who captured the crime, including the audio, saw the appeal and submitted media to the system by utilizing the tag. Assume that the person who captured smartphone video of the suspect leaving the store also submitted media capturing the incident. In addition, assume that several people submitted media that was completely unrelated to the incident (e.g. wrong time, wrong place, etc.).

The artifact detection and prioritization module 176 may the process all media associated with the incident in order to detect the artifacts of interest and properly prioritize the media. For example, media that was not generated at the appropriate time may be placed lower in the priority list than media that was generated at the time of interest. Such information is typically available within the metadata of the media file. Furthermore, in some cases, the location of where media is generated is stored in the metadata of the media file. Media files that were generated at locations other than the incident location may be lower in priority than those that were generated at the incident location. As such, media files that can be determined to not be associated with the incident can be lowered in priority without even needing to process the content of those files.

After the prioritization based on when/where the media was generated, prioritization can continue based on the actual content of the media files. The known techniques used to identify artifacts of interest (e.g. facial recognition, ALPR, object classifiers, appearance search, etc.) may be used to identify those media files that contain the selected artifacts of interest. As such, media that was submitted that does not contain artifacts of interest are prioritized lower than those that do contain artifacts of interest.

In the present example, the artifacts of interest are a person wearing jeans and a red shirt, the storefront logo, and the presence of a gun. Assume the media, including audio, that was captured by the customer inside the store as well as the surveillance camera covering the cash register captured the same artifacts of interest (e.g. person wearing jeans and red shirt, presence of a gun). However, assume that only the smartphone media captured by the customer contains the audio. As such, the customer in the store media would be prioritized over the cash register surveillance camera media. Likewise, if the resolution of the in store customer media is better than that of the cash register surveillance camera, the in store customer media would be prioritized.

With respect to media of the suspect fleeing, assume that a bad actor submitted video that was generated at the same time as the incident of interest, but not at the same location (assume the metadata did not include location information) and submitted the video in response to the appeal. The video may be automatically reviewed by the artifact detection and prioritization module to detect the presence of any of the artifacts of interest. In this case, assume that any video of the suspect fleeing the store would include the storefront logo artifact of interest. Thus, and video not including the storefront logo artifact of interest will be lower in priority.

In the present example, there is media available of the suspect fleeing from both the fixed surveillance camera as well as the passerby. Assume that the storefront logo artifact of interest is present in both media files. However, the media files may have different characteristics. For example, the fixed camera will generally have a more stable image than the shaky image often produced by smartphone cameras. As such, the fixed camera video may be prioritized over the media provided by the passerby.

The order of the prioritized media may be stored in the prioritized media database 150. Law enforcement personnel may then view the media, in priority order, such that the most relevant media is viewed first. It should be noted that the prioritization was done using an automated mechanism that does not require a human operator to initially view all received media in essentially random manner.

Timeline creation module 178 may then be utilized to generate a video time line of the incident by selecting the highest priority media available for each time slice. For example, consider that the incident occurred over a two-minute period of time and that a 30 second time slice is chosen. Assume that for the first two time slices, the suspect is inside the store. Thus, the two higher priority media files are those generated by the cash register surveillance camera and the smartphone camera that captured audio. Because the smartphone captured audio, it may be considered higher priority than the surveillance camera, and thus the media provided by the smartphone will be included in the timeline.

Assume that when the suspect initially leaves the store (e.g. $3^{rd}$ time slice), the fixed surveillance camera has a stable image of the suspect (in contrast with the shaky media from the passerby). As such, the media form the fixed camera may be chosen for inclusion in the timeline, because it is the higher priority media. Now, assume that during the fourth time slice, a truck has blocked the field of view of the fixed camera. As such, the smartphone media of the passerby is now the highest priority media and is included in the timeline.

Figure 2:
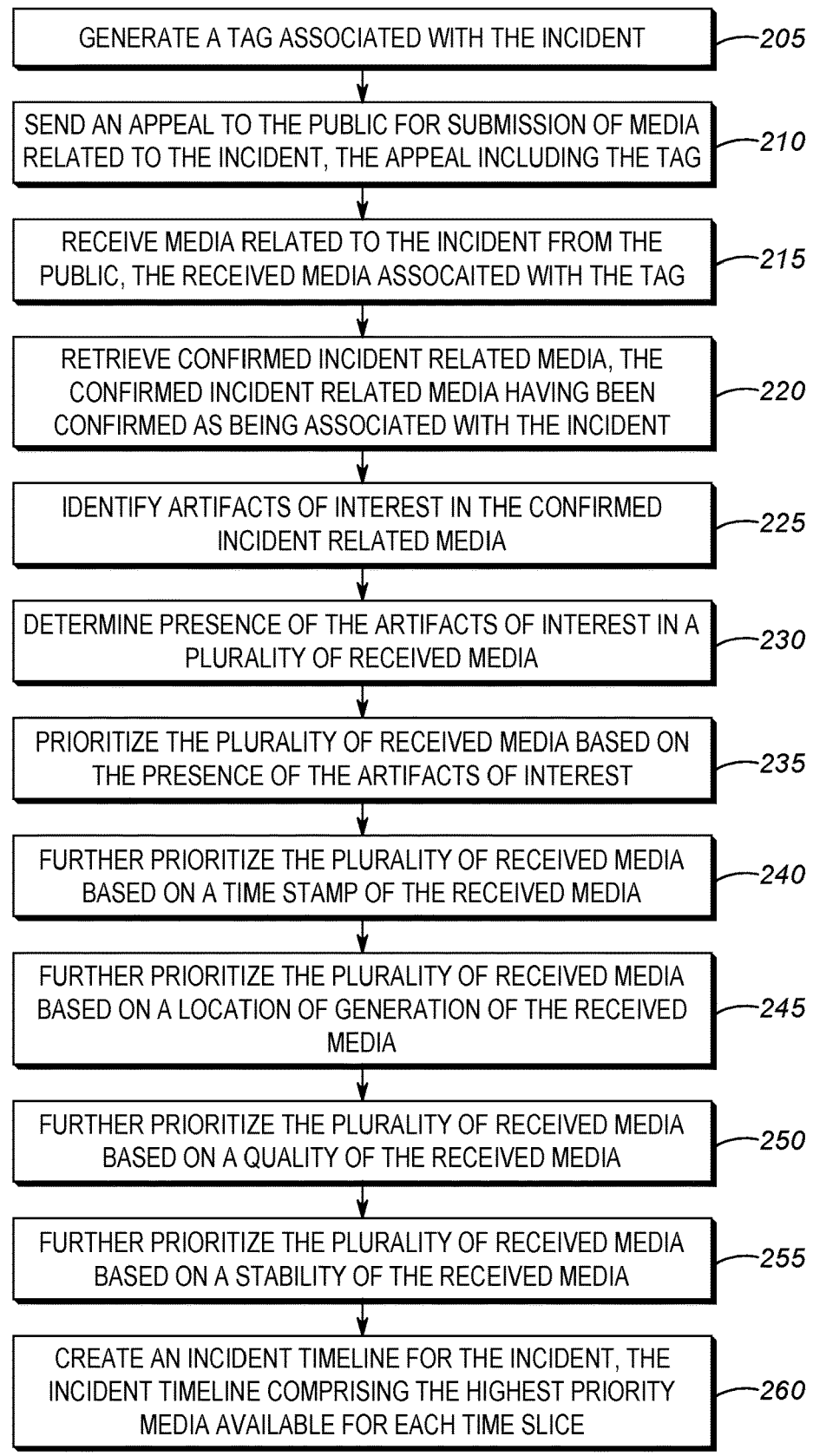
FIG. 2 is an example of a flow diagram for prioritization of media related to an incident.

FIG. 2 is an example of a flow diagram for prioritization of media related to an incident. In block 205, a tag associated with the incident may be generated. For example, an incident may have occurred, and a law enforcement officer wishes to engage the public by requesting media associated with the incident. The tag could be in the form of a QR code, a bar code, a URI, a website, a shared folder on a cloud file system, etc. The particular form of the tag is relatively unimportant. Any type of tag that could be associated with the incident and direct received media to a storage location where it can be retrieved based on the tag is suitable for use with the techniques described herein.

In block 210, an appeal to the public for submission of media related to the incident may be sent, the appeal including the tag. There are many ways appeals to the public may be sent, including via social media postings (e.g. facebook, twitter, etc.), via traditional media (e.g. segments on television news, radio, etc.), via law enforcement agency websites, etc. The techniques described herein are suitable for use with any communication technique in which the tag may be included. For example, in a television news report, a QR code tag could be displayed on screen. On a web page, a URI directing the user to a specific upload location could be provided. What should be understood is that when the public appeal is made, the associated tag is included with the appeal.

In block 215, media related to the incident may be received from the public, the received media associated with the tag. In other words, as members of the public access the tag (e.g. scan QR code, click on link, etc.) and upload media files, those media files are associated with the tag, which effectively associates the media file with the incident for which the appeal was sent. In some implementations, the association may be included in the files metadata. In other implementations, a storage system location (e.g. file folder, etc.) may be designated for each tag generated, and as media is sent, it is stored in the folder associated with the tag. What should be understood is that the tag allows a public safety official to reduce the amount of potential media that needs to be reviewed for an incident by limiting the pool of media to that which was the result of an appeal for media for a specific incident.

In block 220, confirmed incident related media may be retrieved, the confirmed incident related media having been confirmed as being associated with the incident. As explained above, there may be some media that is confirmed as being related to the incident. For example, when an officer arrives at an incident scene, he may generate dashboard camera or body worn camera footage. Because this media is produced by the officer when arriving at the incident scene, it is ensured that it is footage of the incident scene. Likewise, there may be fixed camera footage of an incident scene. Because fixed cameras generally do not move, there is a high degree of confidence that any video generated by a fixed camera covering an incident scene does actually include confirmed incident related media.

In block 225, artifacts of interest in the confirmed incident related media may be identified. The artifacts of interest comprise objects within the confirmed incident related media. As explained above, public safety officials may have certain artifacts of interest that they wish to obtain further information about. Some examples may include a car that was present (e.g. make/model/color, license plate, etc.), faces of people who were on scene, appearance of people present at the incident scene, landmarks associated with the incident scene (e.g. a store front, a street sign, an address, etc.). What should be understood is that the artifacts are visual items that have been confirmed to have been at the incident scene at the time of the incident.

In block 230, presence of the artifacts of interest in the plurality of received media may be determined. In other words, the media received from the public may be analyzed to determine if the media contains any of the identified artifacts of interest. For example, if a crime occurred outside a specific store, and the artifact of interest was identified as an image of the store front, the received media may be analyzed to determine if any of that media included the artifacts of interest, which would indicate that the media does actually capture the incident scene.

In block 235, the plurality of received media may be prioritized based on the presence of the artifacts of interest. Continuing with the example where the artifact of interest was an image of a store front, it should be clear that media that includes the store front should be prioritized over media that does not include the image of the store front. By prioritizing video as such, the officer need not waste time initially reviewing media to determine if it even contains artifacts of interest. The prioritization assures that those media files that include artifacts of interest are prioritized over those that don't. Note, this is not to say that received media files that do not contain the artifacts of interest are discarded, but rather that the order of viewing may be based on the prioritization, such that media that contains artifacts of interest are viewed before other media.

In block 240, the plurality of received media may be further prioritized based on a timestamp of the media. When a public appeal is sent out for media covering an incident area, it will be generally sent requesting media for a particular time (e.g. media from First National Bank on $2^{nd}$ Street, on Nov. 5, 2019, between 3-5 PM). Media may be submitted that includes the proper location, but was captured at times that are completely outside of the timeframe of interest. Thus, media that has a timestamp that is within the timeframe of interest may be prioritized over media that has timestamps that are outside the timeframe of interest. Media with timestamps outside the timeframe of interest is not discarded, but is simply lower in priority.

In block 245, the plurality of received media may be further prioritized based on a location of generation of the media of the received media. Many devices today (e.g. digital cameras, smartphones, etc.) are equipped with GPS capabilities and can include metadata in the media indicating the geographic location where the media was captured. Media that is indicated as being generated at the location of interest may be prioritized over media that was not generated at the location of interest. Again, media that was not generated at the location of the area of interest is not discarded, but is simply lower in priority.

Furthermore, location of generation of media should not be conflated with artifacts that are of interest. For example, an artifact of interest may be an image of a storefront where a crime occurred. A high resolution fixed camera may be located multiple blocks away from the incident location, but due to the high resolution, still produces media containing the artifact of interest. Even though the location of generation of the media would indicate it is several blocks away from the incident location, the fact that the media contains an artifact of interest places it in a higher priority category. Inclusion of an artifact of interest may outweigh the location of where the media was generated.

In block 250, the plurality of received media may be further prioritized based on a quality of the received media. For example, all other things being equal, media with a higher resolution is prioritized over media with a lower resolution. Media that has better lighting is prioritized over media that that substandard lighting. Media taken with professional grade equipment (e.g. high quality surveillance camera) is prioritized over consumer grade equipment (e.g. webcam, etc.). Again, media that is of lower quality is not discarded, but is simply lower in priority.

In block 255, the plurality of received media may be further prioritized based on a stability of the received media. A wall mounted, fixed surveillance camera may produce media that is significantly more stable than that which is produced by a civilian holding a smartphone camera. Thus, all other things being equal, the stable, fixed camera media may be prioritized over the shaky smartphone media. Again, media that is of lower stability is not discarded, but is simply lower in priority.

In block 260, an incident timeline may be created. The incident timeline may comprise the highest priority media available for each time slice. In other words, a video timeline may be created that is made up of the best available piece of media (e.g. the highest priority media) for each slice of time on the timeline. For example, consider the case where an incident scene is a storefront, and an appeal was sent out for media including an image of the store front. Assume many pieces of media were received that include an image of the storefront. A decision may be made that the timeline will be created with a 30 second timeslice. It should be understood that the selection of a 30 second timeslice is for purposes of explanation, and not by way of limitation.

For each 30 second time slice, the received media may be analyzed to determine which piece of media has the highest priority (e.g. most relevant. best quality, etc.) for that 30 second time slice. The highest priority piece of media may then be included in the timeline. This process may continue for each subsequent time slice. Thus, upon completion, a media timeline of the incident may be created, with each time slice of the incident represented by the media with the highest priority for that time slice.

Figure 3:
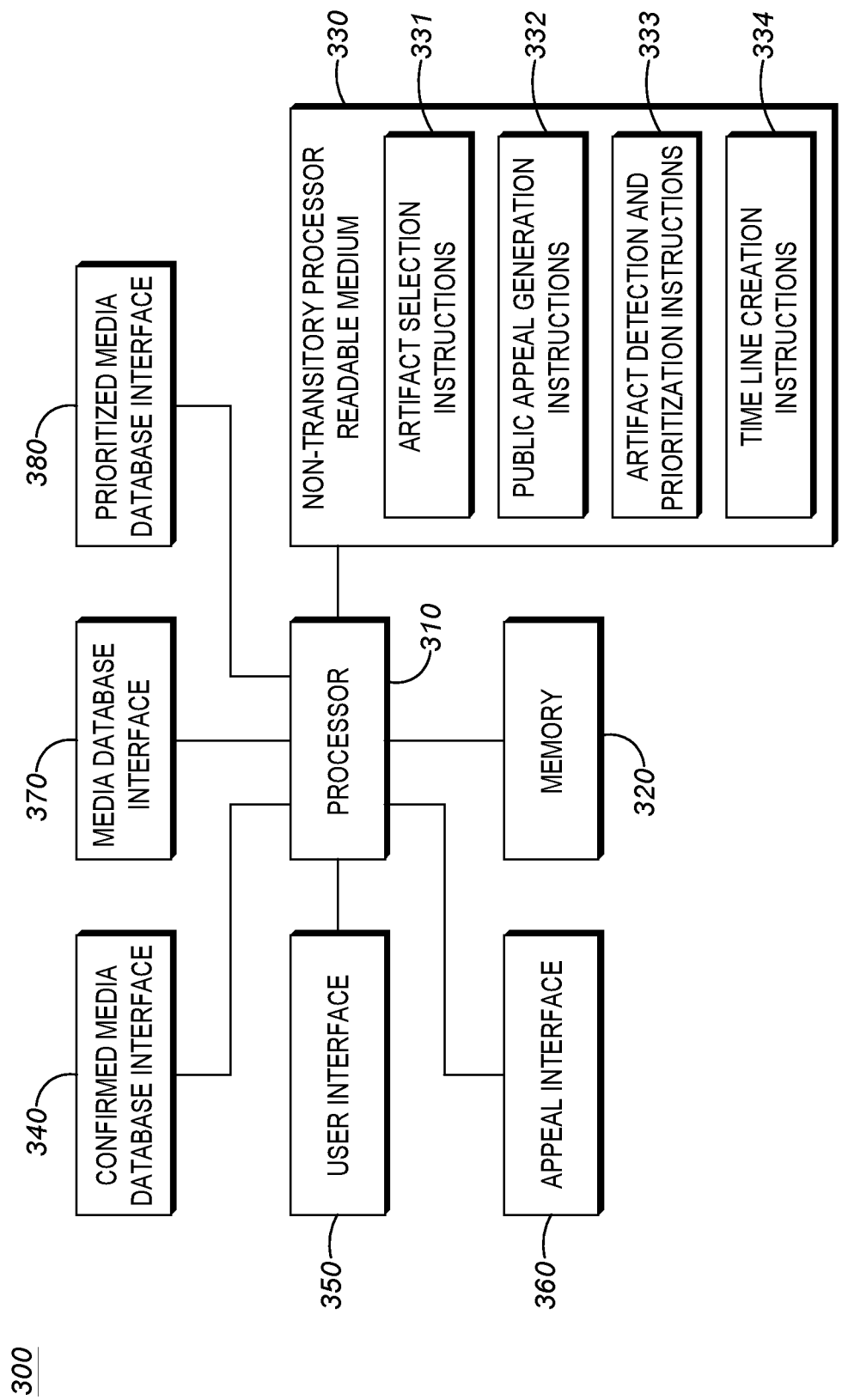
FIG. 3 is an example of a device that may implement the prioritization of media related to an incident techniques described herein.

FIG. 3 is an example of a device that may implement the prioritization of media related to an incident techniques described herein. It should be understood that FIG. 3 represents one example implementation of a computing device that utilizes the techniques described herein. Although only a single processor is shown, it would be readily understood that a person of skill in the art would recognize that distributed implementations are also possible. For example, the various pieces of functionality described above (e.g. artifact selection instructions, artifact detection and prioritization instructions, etc.) could be implemented on multiple devices that are communicatively coupled. FIG. 3 is not intended to imply that all the functionality described above must be implemented on a single device.

Device 300 may include processor 310, memory 320, non-transitory processor readable medium 330, confirmed media database interface 340, user interface 350, appeal interface 360, media database interface 370, and prioritized media database interface 380.

Processor 310 may be coupled to memory 320. Memory 320 may store a set of instructions that when executed by processor 310 cause processor 310 to implement the techniques described herein. Processor 310 may cause memory 320 to load a set of processor executable instructions from non-transitory processor readable medium 330. Non-transitory processor readable medium 330 may contain a set of instructions thereon that when executed by processor 310 cause the processor to implement the various techniques described herein.

For example, medium 330 may include artifact selection instructions 331. The artifact selection instructions may cause device 300 to implement the functionality of retrieving confirmed media from the confirmed media database via confirmed media database interface 340. As explained above, confirmed media may be media that has been confirmed to be associated the incident location. User interface 350, may be an interface that allows a user to select artifacts of interest within the confirmed media. The user interface, for example, may be a graphical user interface that allows the user to select artifacts of interest on a screen using a pointing device such as a mouse. It should be understood that although a graphical user interface is the most common user interface, the techniques described herein are not so limited. The functionality provided by the artifact selection instructions 331 is described throughout the specification, including places such as blocks 220-225 in FIG. 2.

The medium 330 may also include public appeal generation instructions 332. The public appeal generation instructions may cause the device 300 to implement the function of generating a tag associated with an incident and associating that tag with an appeal sent to the public. For example, the appeal may be sent using appeal interface 360. Appeal interface 360 may be an interface to a social media system (e.g. Facebook, Twitter, etc.) or may be an interface to a more traditional system (e.g. television, radio, etc.). The functionality provided by public appeal generation instructions 332 is described throughout the specification, including places such as blocks 205-215 in FIG. 2.

The medium 330 may also include artifact detection and prioritization instructions 333. The artifact detection and prioritization instructions may cause the device 300 to implement the functionality of retrieving media from the media database via media database interface 370. As explained above media received from the public may be stored in the media database. The artifact detection and prioritization instructions may retrieve the media received in response to the public appeal and process that media to prioritize based on the presence of artifacts of interest as well as other information related to the media itself (e.g. metadata). The prioritized media may then be stored in the prioritized media database by using the functionality provided by the prioritized media database interface 380. It should be noted that the user may view the prioritized media, in priority order, by utilizing user interface 350. The functionality provided by artifact detection and prioritization instructions 333 is described throughout the specification, including places such as blocks 230-255 in FIG. 2.

The medium 330 may also include time line creation instructions 334. Time line creation instructions may cause the device 300 to implement the functionality of creating a time line based on the prioritized media, by using the highest priority media available for each time slice for that time slice. The resultant time line may then be viewed by the user via user interface 350. The functionality provided by time line creation instructions 334 is described throughout the specification, including places such as block 260 in FIG. 2.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. Reference to at least one of elements A and B means any number of element A alone, any number of element B alone, or any combination of any number of element A and element B. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

In the exemplary flow diagrams presented in this disclosure do not imply that all steps in the flow diagram must be performed or that the steps must be performed in the order shown. The steps may be performed in any order. Performance of some steps may be omitted. Performance of additional steps that are not shown may be included. What should be understood is that the flow diagrams are merely examples and are not intended to limit the scope of the appended claims.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a compact disc read only memory (CD-ROM), an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (IC) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for prioritization of media related to an incident comprising:
   generating a tag associated with the incident;
   sending an appeal to the public for submission of media related to the incident, the appeal including the tag;
   receiving media related to the incident from the public, the received media associated with the tag;
   digitally signing the received media to ensure it has not been altered after receipt;
   retrieving confirmed incident related media, the confirmed incident related media having been confirmed as being associated with the incident, the confirmed incident related media having been obtained by an officer from a camera at the incident scene;
   identifying artifacts of interest in the confirmed incident related media, wherein the artifacts of interest comprise objects within the confirmed incident related media, wherein the artifacts of interest can be identified through automated object classifiers;
   determining presence of the artifacts of interest in the received media; and
   prioritizing the received media based on the presence of the artifacts of interest.

2. The method of claim 1 further comprising:
   further prioritizing the plurality of received media based on at least one of:
   a timestamp of the received media; and
   a location of generation of the received media.

3. The method of claim 1 further comprising:
   further prioritizing the plurality of received media based on a quality of the received media.

4. The method of claim 1 further comprising:
   further prioritizing the plurality of received media based on a stability of the received media, wherein stability refers to an amount of shakiness in the video, wherein received media with less shakiness is prioritized over received video with more shakiness.

5. The method of claim 1 further comprising:
   creating an incident timeline for the incident, the incident timeline comprising the highest priority media available for each time slice.

6. A system for prioritization of media related to an incident comprising:
   a processor; and
   a memory coupled to the processor, the memory containing a set of instructions thereon that when executed by the processor cause the processor to:
   generate a tag associated with the incident;
   send an appeal to the public for submission of media related to the incident, the appeal including the tag;
   receive media related to the incident from the public, the received media associated with the tag;
   digitally sign the received media to ensure it has not been altered after receipt;
   retrieve confirmed incident related media, the confirmed incident related media having been confirmed as being associated with the incident, the confirmed incident related media having been obtained by an officer from a camera at the incident scene;
   identify artifacts of interest in the confirmed incident related media, wherein the artifacts of interest comprise objects within the confirmed incident related media, wherein the artifacts of interest can be identified through automated object classifiers;
   determine presence of the artifacts of interest in the received media; and
   prioritize the received media based on the presence of the artifacts of interest.

7. The system of claim 6 further comprising instructions to:
   further prioritize the plurality of received media based on at least one of:
   a timestamp of the received media; and
   a location of generation of the received media.

8. The system of claim 6 further comprising instructions to:
   further prioritize the plurality of received media based on a quality of the received media.

9. The system of claim 6 further comprising instructions to:
   further prioritize the plurality of received media based on a stability of the received media, wherein stability refers to an amount of shakiness in the video, wherein received media with less shakiness is prioritized over received video with more shakiness.

10. The system of claim 6 further comprising instructions to:
    create an incident timeline for the incident, the incident timeline comprising the highest priority media available for each time slice.

11. A non-transitory processor readable medium containing a set of instructions thereon that when executed by a processor cause the processor to:
    generate a tag associated with the incident;
    send an appeal to the public for submission of media related to the incident, the appeal including the tag;
    receive media related to the incident from the public, the received media associated with the tag;
    digitally sign the received media to ensure it has not been altered after receipt;

retrieve confirmed incident related media, the confirmed incident related media having been confirmed as being associated with the incident, the confirmed incident related media having been obtained by an officer from a camera at the incident scene;

identify artifacts of interest in the confirmed incident related media, wherein the artifacts of interest comprise objects within the confirmed incident related media, wherein the artifacts of interest can be identified through automated object classifiers;

determine presence of the artifacts of interest in the received media; and prioritize the received media based on the presence of the artifacts of interest.

12. The medium of claim 11 further comprising instructions to:

further prioritize the plurality of received media based on at least one of:

a timestamp of the received media; and a location of generation of the received media.

13. The medium of claim 11 further comprising instructions to:

further prioritize the plurality of received media based on a quality of the received media.

14. The medium of claim 11 further comprising instructions to:

further prioritize the plurality of received media based on a stability of the received media, wherein stability refers to an amount of shakiness in the video, wherein received media with less shakiness is prioritized over received video with more shakiness.

15. The medium of claim 11 further comprising instructions to:

create an incident timeline for the incident, the incident timeline comprising the highest priority media available for each time slice.

* * * * *